(No Model.)

J. NASE.
BICYCLE TIRE.

No. 542,683.  Patented July 16, 1895.

WITNESSES:
J. J. Laass
C. L. Bendixen

INVENTOR
John Nase
By Hull, Laass & Dull
his ATTORNEYS.

UNITED STATES PATENT OFFICE.

JOHN NASE, OF SYRACUSE, NEW YORK, ASSIGNOR OF ONE-HALF TO AUSTIN R. DICKINSON, OF SAME PLACE.

BICYCLE-TIRE.

SPECIFICATION forming part of Letters Patent No. 542,683, dated July 16, 1895.

Application filed January 25, 1893. Serial No. 459,647. (No model.)

*To all whom it may concern:*

Be it known that I, JOHN NASE, of Syracuse, in the county of Onondaga, in the State of New York, have invented new and useful Improvements in Bicycle-Tires, of which the following, taken in connection with the accompanying drawings, is a full, clear, and exact description.

The object of this invention is to provide simple, convenient, and effective means for securing the elastic tire of a bicycle to the felly of the wheel; and to that end the invention consists essentially in the combination of the felly provided with outwardly-turned flanges, the tire provided with circumferential ribs seated against such flanges, and laterally-spreading plates clamping said ribs on the flanges of the felly, as hereinafter more fully described, and specifically set forth in the claims.

Figure 2:
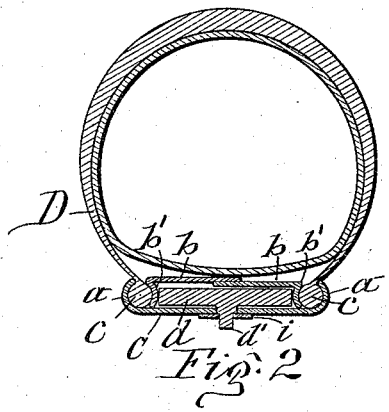
Figure 1:
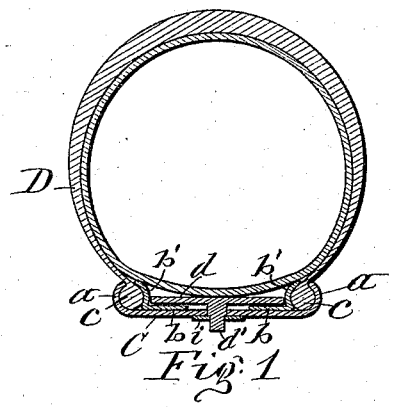
Figure 3:
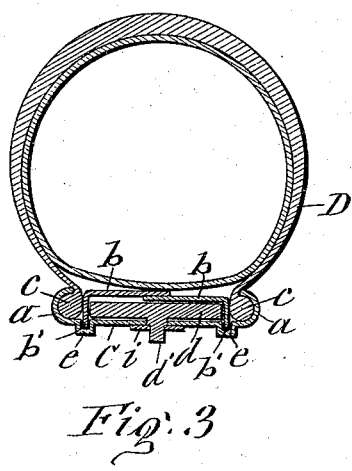
Figure 4:
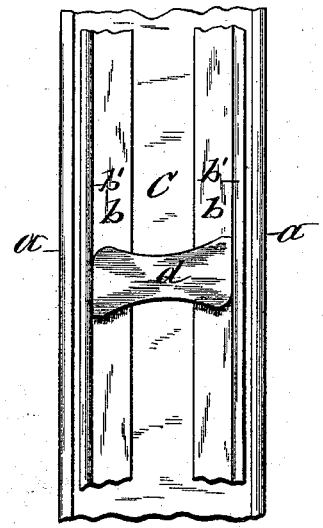
Figure 5:
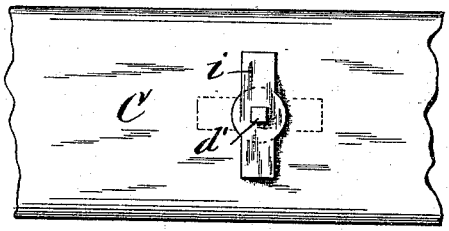

In the annexed drawings, Figures 1, 2, and 3 are transverse sectional views of fellies with the elastic tire attached thereto by my improved fastening devices. Fig. 4 is a plan view of the exterior of the fastening devices shown in Fig. 1, and Fig. 5 is a plan view of the inner side of the felly provided with said fastening devices.

Similar letters of reference indicate corresponding parts.

C represents the felly of a bicycle-wheel, and D denotes the elastic tire, which may be of any suitable and well-known construction. Said tire is provided with the circumferential ribs $c\ c$ similar to other tires of this class. To fasten this tire to the felly I form the latter with the circumferential outwardly-turned flanges $a\ a$, and preferably bend said flanges toward each other, so as to form them concave on their inner sides, as shown.

Upon the exterior of the felly I place two rings $b\ b$, each of which is formed with a flange $b'$ facing one of the flanges $a$. Between the flanges $a\ a$ and the adjacent flanges $b'\ b'$ are inserted the ribs $c\ c$ of the tire, which are clamped therein by cams $d$, pivoted to the felly and bearing against the inner sides of the flanges $b'\ b'$, so as to force the two plates $b\ b$ laterally outward from each other, which effect is produced by turning the cams so as to stand transversely in relation to the felly, as shown in Fig. 4 of the drawings. To permit the cams to be turned as aforesaid the stems $d'$ of the cams are made to protrude at the inner side of the felly and have affixed to them cross-bars or suitable cross-heads $i$ by which to turn the stems with the cams attached thereto. The cross-bar $i$ is arranged on the stem so as to cause said bar to stand crosswise of the felly when the cam $d$ is turned to spread the plates $b\ b$ apart and clamp the tire on the felly, as before described. I also prefer to form the inward-protruding end of the stem square or otherwise angular for the application of a wrench by which to turn the stem when required.

The flanges $a\ a$ may project either outward and the cam made to lie over the plates $b\ b$, as shown in Fig. 1 of the drawings, or said flanges may be made to project inward and the cam lie under the plates $b\ b$, as represented in Figs. 2 and 3 of the drawings.

When arranged as last described, I prefer to form the felly with the circumferential grooves $e\ e$, into which the edges of the flanges $b'\ b'$ enter when the tire is clamped on the felly, as shown in Fig. 3 of the drawings.

When it becomes necessary to remove the tire from the felly the cams $d$ are to be turned to stand tangential to the felly, and when in this position the ends of said cams pry the rings outward from the felly sufficiently to lift the flanges $b'\ b'$ out of the grooves $e\ e$. The plates $b\ b$ are then free to move toward each other and release the ribs $c\ c$ of the tire from the grip of the flanges.

Having described my invention, what I claim as new, and desire to secure by Letters Patent, is—

1. The combination of the felly provided with outwardly turned flanges, the tire provided with circumferential ribs seated against said flanges, and laterally spreading plates clamping said ribs on the flanges of the felly as set forth.

2. The combination of the felly provided with outwardly turned flanges —$a$—$a$— concaved in the sides facing each other, rings —$b$—$b$— formed with flanges —$b'$—$b'$—, the tire provided with circumferential ribs —$c$—$c$— seated between the flanges —$a$— and —$b'$—, and the cam —$d$— forcing the said rings laterally from each other and clamping the aforesaid ribs between the flanges as set forth.

3. The combination of the felly formed with outwardly turned flanges —a—a—, rings —b—b— formed with flanges —b'—b'—, the tire provided with circumferential ribs —c—c—, seated between said flanges, and the cams —d— pivoted to the felly and having their stems protruding at the inner side of the felly for turning the cams as and for the purpose set forth.

4. The combination of the felly formed with the flanges —a—a— and grooves —e—e—, the rings —b—b— provided with the flanges —b'—b'— entering said grooves, the tire provided with the ribs —c—c— seated between said flanges, and the cams —d— pivoted to the felly and forcing the rings laterally from each other and clamping the aforesaid ribs between the flanges, and the cross-bars —i— affixed to the stems at the inner side of the felly to lock said stems in their position, as set forth.

In testimony whereof I have hereunto signed my name this 18th day of January, 1893.

JOHN NASE. [L. S.]

Witnesses:
H. M. SEAMANS,
M. M. NOTT.